Aug. 9, 1949.   J. T. OVERSTREET   2,478,308
HEADLIGHT DIMMER
Filed Dec. 12, 1945   2 Sheets-Sheet 1

John T. Overstreet.
Inventor.
Attorney.

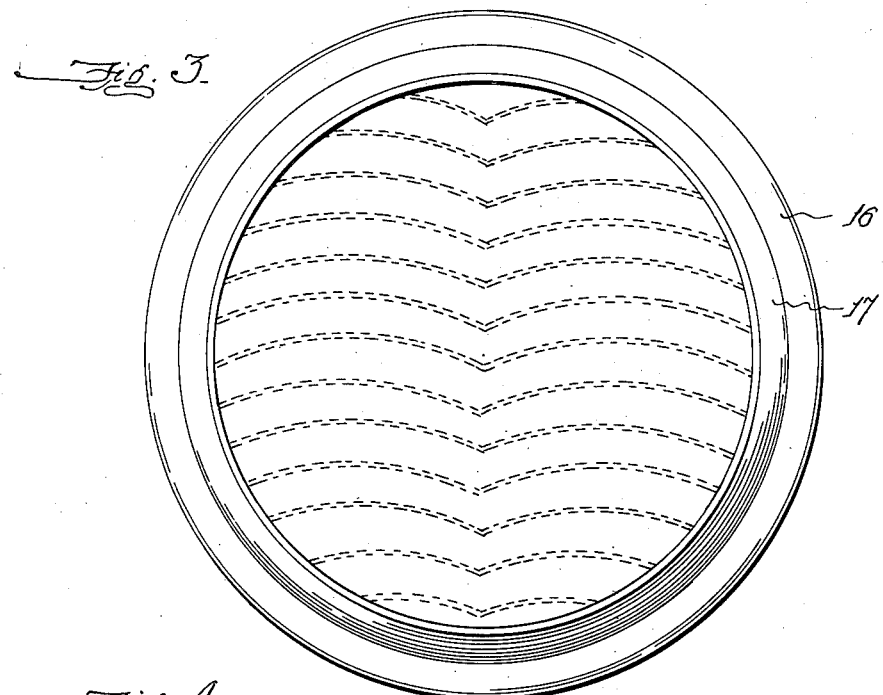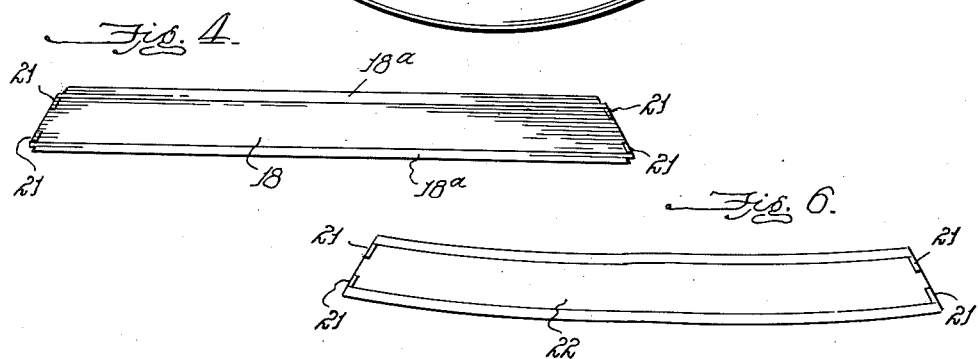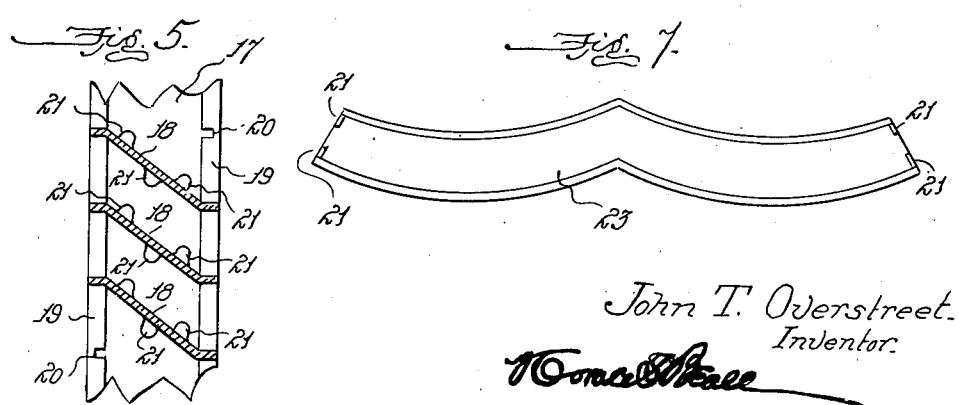

Patented Aug. 9, 1949

2,478,308

UNITED STATES PATENT OFFICE 2,478,308

HEADLIGHT DIMMER

John T. Overstreet, San Antonio, Tex.

Application December 12, 1945, Serial No. 634,503

2 Claims. (Cl. 240—46.31)

My invention is an improvement in headlights for motor vehicles, with particular reference to the provision of means for concentrating the brighter rays of light on to the roadway immediately ahead of the vehicle while diffused rays are projected upwardly and to opposite sides of the roadway so as to dim the headlight in respect to the drivers of approaching vehicles.

In this instance I accomplish the purpose by the provision of spaced apart transverse light reflecting strips at the front of the headlight in the rear of the lens with the strips disposed at an inclination laterally and silvered on both sides, whereby the brighter or more direct rays from the headlight are concentrated for projecting a beam illuminating the roadway immediately in front of the vehicle while the indirect rays—or diffused light reflected from said strips—extend above and at opposite sides of the stronger beam to dim that part of the headlight which is reflected in the eyes of drivers of approaching vehicles and pedestrians on the roadway, or at the sides of the same, in advance of the vehicle having the headlight dimmer.

My invention therefore contemplates the provision of a dimmer attachment for headlights comprising a series of light reflecting strips of particular construction secured to a supporting ring to facilitate the application of the attachment to a conventional type of headlight; as hereinafter described and more specifically set forth in the appended claims.

In the accompanying drawings, forming a part of this specification:

Fig. 3 is a rear view of the ring which supports the reflecting strips, including a modification of the strips—indicated in dotted lines.

Fig. 4 is a detail view of the preferred form of reflecting strip;

Fig. 5 is an enlarged view illustrating the means for securing the light reflecting strips to the supporting ring; and Figs. 6 and 7 show modifications of the reflecting strips.

Figure 1:
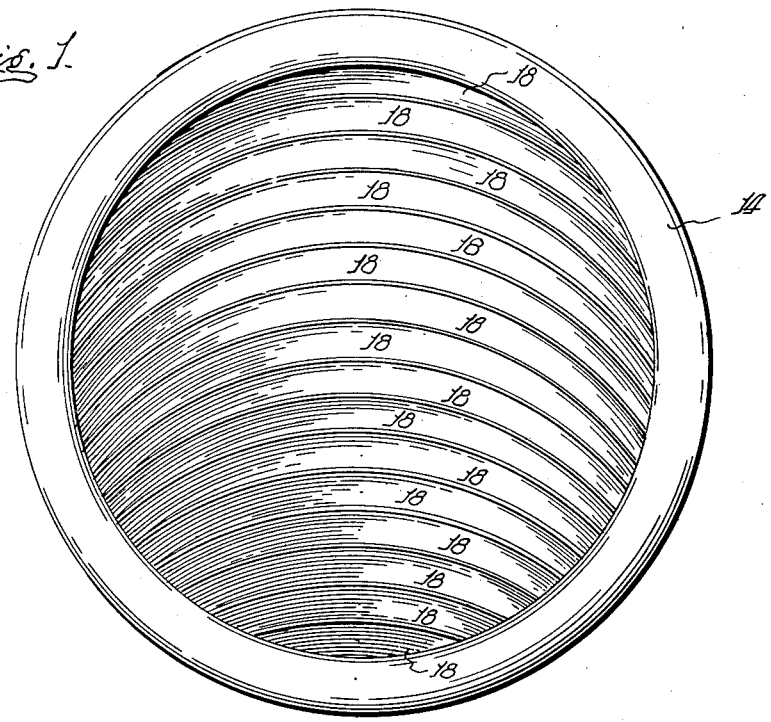
Fig. 1 is a front elevational view of a headlight provided with my improved dimmer attachment.
Figure 2:
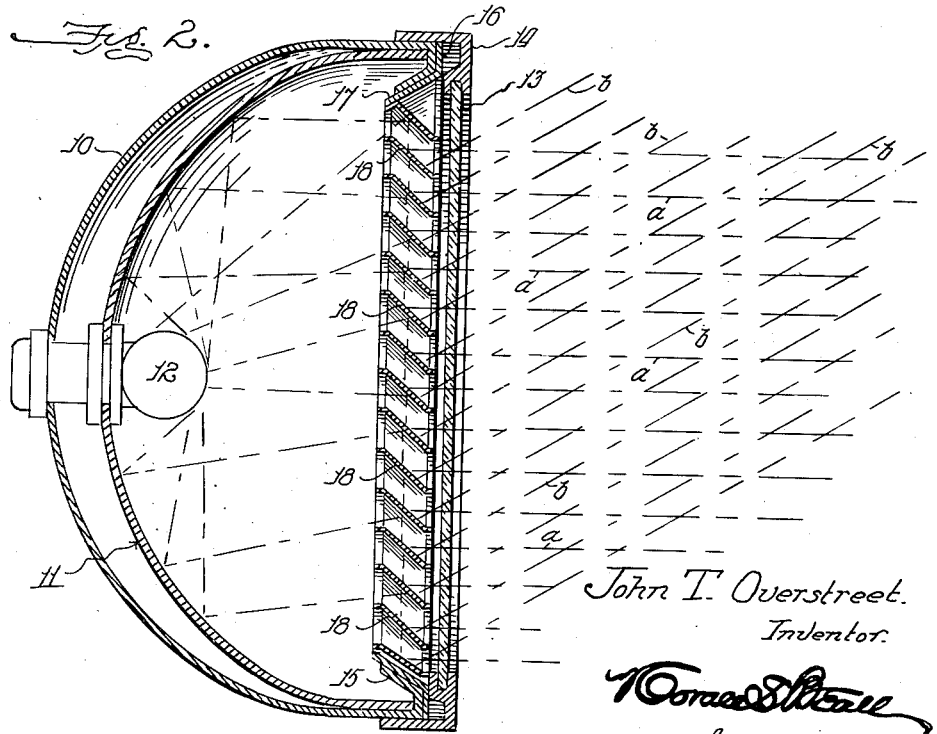
Fig. 2 is a vertical sectional view thereof.

My improved dimmer attachment, hereinafter fully described, is applicable to a conventional type of motor vehicle headlight such as illustrated in Figs. 1 and 2 of the drawings in which 10 designates the outer casing, 11 the reflector enclosed therein, and 12 the light bulb—the outer end of the casing having the usual glass or lens 13 carried by a circular frame 14 fitting over the casing and secured thereto in the usual manner. In this instance, however, the inwardly projecting flange 15 at the forward end of the headlight casing converges slightly inwardly (as shown in Fig. 2) in order to receive the attachment and hold it firmly within the casing.

The dimmer attachment, in accordance with my invention, comprises a ring angular in cross-section to present an outer rim 16—which bears against the outer edge of the casing 10— and an inwardly projecting portion 17 at an inclination to correspond with that of the aforementioned flange 15 of the headlight casing. This ring is for the purpose of supporting a series of transverse light reflecting strips 18 which are spaced apart a predetermined distance and disposed at a downward inclination forwardly so that the rays of light from the light-bulb and reflector will be deflected as indicated by the broken lines in Fig. 2 of the drawings; that is to say, the rays of light $a$ from the reflecting strips will be projected in a direct line forwardly while the rays $b$ will be directed upwardly—it being understood that the strips are silvered on both sides so that the rays of light striking against the underside of each strip will be deflected to the upper side of the strip below and projected on a direct line forwardly while indirect rays at the forward ends of the strips will be diverted upward, as indicated by the broken lines $b$. The longitudinal edges of the strips are preferably bent at an angle as shown, those at the forward part of the strips directing the rays of light upwardly in contradistinction to those forming the bright beam of light.

The light reflecting strips are preferably curved upward throughout their entire length, as illustrated in Fig. 1, so as to concentrate the beam directed on to the roadway, amplified by curving them outward laterally as in Fig. 6.

For securing the light reflecting strips to the supporting ring I prefer the means illustrated in Fig. 5, from which it will be noted they are firmly held in spaced relation by means of narrow annular flanges 19 at opposite edges of the inwardly projecting portion 17 of the ring, said holding strips being notched, at 20, to receive the correspondingly notched edges at the outer ends of the light reflecting strips, and are more securely attached to the ring by means of ears 21 formed integral therewith and welded to the inner side of the ring. This arrangement provides a substantial construction in compact form.

As a further modification in respect to the light reflecting strips they may be laterally curved outward at opposite sides of the center (23 in Fig. 7) instead of having the strip (22, Fig. 6) curved outwardly its entire length, and it will be obvious that the brighter beam of light may be concentrated to a greater extent by curving the light reflecting strips longitudinally upward.

The attachment can be readily applied to the headlight by placing it in engagement with the flange 15 at the outer end of the casing 10, being securely held in place by the circular frame 14 which carries the lens, and as hereinbefore explained the dimmer attachment will provide for effectively illuminating the roadway for the driver of the vehicle having the attachment in connection with the headlights and present a dim light to the drivers of automobiles approaching from the opposite direction, thus furnishing an element to advance the safe operation of automobiles and other motor vehicles.

I claim:

1. A dimming attachment for the headlight of a motor vehicle comprising a supporting ring having inwardly turned annular flanges at the edges thereof adapted to fit within the headlight casing and be retained therein by the frame carrying the lens of the headlight, spaced apart transverse light reflecting strips extending from one side of the ring to the other and disposed at a downward inclination forwardly, said strips being curved upwardly to direct the brighter rays of reflected light on to the roadway in front of the vehicle while the diffused rays are projected upward and to opposite sides to reflect a dim light in the eyes of the driver of an approaching vehicle, and means at the end of said strips adapted to engage said flanges for firmly securing the light reflecting strips to the ring.

2. A dimming attachment for the headlight of a motor vehicle in accordance with claim 1 and in which the means for securing the spaced apart light reflecting strips includes inwardly facing notches in said annular flanges to receive the ends of the light reflecting strips.

JOHN T. OVERSTREET.

REFERENCES CITED

The following references are of record in the file of this patent:

UNITED STATES PATENTS

| Number | Name | Date |
| --- | --- | --- |
| 1,336,407 | Ahman | Apr. 13, 1920 |
| 1,403,628 | Wendt | Jan. 17, 1922 |
| 1,457,630 | Johnson | June 5, 1923 |
| 1,508,224 | Hartmann | Sept. 9, 1924 |
| 1,553,812 | Gillott et al. | Sept. 15, 1925 |
| 1,574,888 | Hixson | Mar. 2, 1926 |
| 1,804,719 | Timmons | May 12, 1931 |
| 2,202,278 | White | May 28, 1940 |